March 3, 1931. A. C. CONNELL 1,795,198
SYSTEM OF ELECTRIC DISTRIBUTION
Filed Feb. 1, 1929

Inventor:
Amos C. Connell,
by Charles E. Mullar
His Attorney.

Patented Mar. 3, 1931

1,795,198

UNITED STATES PATENT OFFICE

AMOS C. CONNELL, OF JACKSON, MICHIGAN, ASSIGNOR TO GENERAL ELECTRIC COMPANY, A CORPORATION OF NEW YORK

SYSTEM OF ELECTRIC DISTRIBUTION

Application filed February 1, 1929. Serial No. 336,858.

My invention relates to systems of electric distribution and particularly to a system comprising an electric circuit divided into a plurality of sections which are connected in series by sectionalizing switches and means for supplying current to one or both of the end sections of the circuit, and its object is to provide an improved arrangement for isolating a faulty section in such a system of distribution from the rest of the circuit.

In accordance with my invention an overload circuit breaker is provided between each source of current and the end section to which it is connected and each sectionalizing switch has means associated therewith which is responsive to the voltages across the two adjacent sections for effecting the opening of the switch when both adjacent sections are simultaneously deenergized, for reclosing the sectionalizing switch when one of the adjacent sections is reenergized for a predetermined time and for preventing a subsequent reclosure of the switch until both adjacent sections have been energized simultaneously for a predetermined time.

My invention will be better understood from the following description when taken in connection with the accompanying drawing and its scope will be pointed out in the appended claims.

Figure 1:
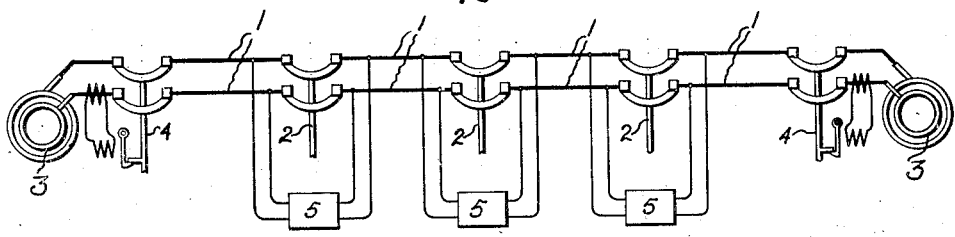
Figure 2:
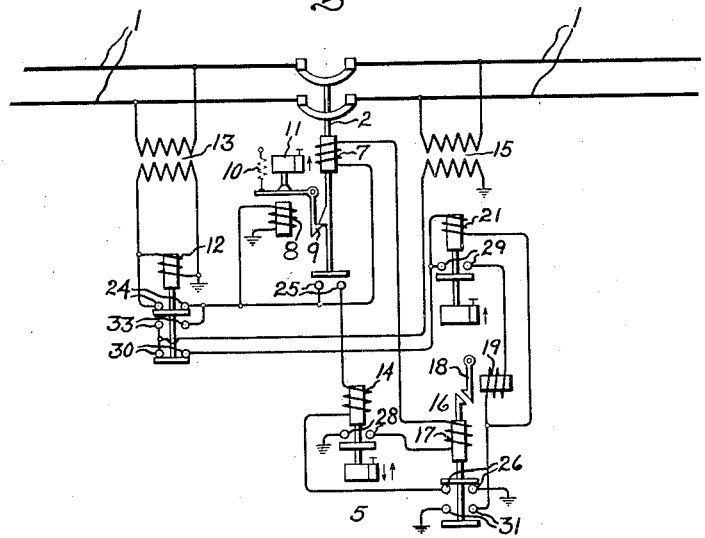

In the accompanying drawing, Fig. 1 is a diagram of a system of distribution to which my invention is particularly applicable and Fig. 2 is a diagram of a control arrangement embodying my invention which may be used to control the sectionalizing switches shown in Fig. 1.

Referring to the system of electric distribution shown in Fig. 1 a plurality of sections 1 of an electric circuit are connected in series by sectionalizing switches 2 and the end sections of the circuit are connected to suitable sources of current 3 by overload circuit breakers 4. While I have shown a source of current connected to each of the two end sections of the circuit, my invention is also applicable to a system in which a source is connected to only one of the end sections. My invention is also applicable to a system in which other switches and overload circuit breakers are interposed in series between an overload circuit breaker 4 and the associated source 3.

In a system of the type shown in Fig. 1, it is desirable to provide each sectionalizing switch with a suitable control arrangement 5 whereby a fault on any section effects the opening of all of the sectionalizing switches after the overload switches 4 have opened to interrupt the supply of current to the circuit and whereby the reclosing of the circuit breakers 4 effects the successive reclosing of the switches beginning with the one nearest the reenergized end section and whereby a switch which reconnects a faulty section to the circuit is opened and locked out against a subsequent reclosure without effecting the locking out of any other switch.

In Fig. 2 I have shown a control arrangement 5 embodying my invention which may be used to control each of the sectionalizing switches 2 of Fig. 1 so as to accomplish the above results. Referring to Fig. 2, the sectionalizing switch 2 is shown as a latched-in switch which is provided with a closing coil 7 for closing the switch and a low voltage trip coil 8 which, when energized, holds a latch 9 in its latching position against the bias of a releasing spring 10. Suitable timing means such as a dash pot 11 is provided so that the latch 9 is not moved out of its latching position until after the voltage impressed upon the trip coil 8 has remained below a predetermined value for a predetermined time.

The trip coil 8 is arranged to be energized in accordance with the voltage across the two adjacent sections 1 when the switch 2 is closed. This result is accomplished by means of a voltage relay 12 which is connected across the secondary of a suitable potential transformer 13, the primary of which is connected across one of the adjacent sections 1. The voltage relay 12 is arranged to connect the trip coil 8 across the secondary of the transformer 13 whenever the voltage of the section, to which the primary of the transformer 13 is connected, is above a predetermined value. In this manner the switch 2 is prevented from opening until after the overload circuit breakers 4 at the ends of the circuit have opened and deenergized the circuit.

In order to effect the successive closing of the switches 2 in Fig. 1 each switch 2 is arranged so that it recloses when either of the adjacent sections is energized for a predetermined time. This result is obtained by means of a time relay 14 which is arranged to be connected across the secondary of the transformer 13 whenever the switch 2 is opened and the section 1, to which the primary of the transformer 13 is connected, is energized and which is arranged to be connected across the secondary of a transformer 15 the primary of which is connected across the other adjacent section 1 when the switch 2 is opened and the section to which the transformer 13 is connected is deenergized. The time relay 14 when energized for a predetermined time is arranged to complete an energizing circuit for the closing coil 7 to close the switch 2.

In order to effect the locking out of the switch 2 when it reconnects a faulty section to the circuit, I provide a lockout relay 16 which controls the circuit of the closing coil 7 so that whenever the lockout relay is in its lockout position the closing coil 7 cannot be reenergized to close the switch. As shown in the drawing, the lockout relay 16 is provided with an operating coil 17 which is arranged so that when it is energized it moves the lockout relay to its lockout position. As shown in the drawing, the operating coil 17 is connected in series with the closing coil 7 so that whenever the switch 2 is closed the associated lockout relay 16 is moved to its lockout position. The lockout relay is held in its lockout position by a latch 18 which is arranged to be released by a release magnet 19. Therefore, it will be observed that each time the switch 2 is closed the lockout relay 16 is moved to its lockout position. In order to effect the resetting of the lockout relay when the switch 2 closes and reconnects a normal section to the circuit, I provide a time relay 21 which is arranged to be energized when both of the adjacent sections are simultaneously energized and the lockout relay 16 is in its lockout position. If the time relay 21 remains energized for a predetermined time, it completes an energizing circuit for the release coil 19 so that the lockout relay 16 returns to its normal position.

The time settings of the relays 21 and 14 are adjusted so that they are both longer than the overload time settings of the overload circuit breakers 4 and the time setting of the relay 21 is shorter than the time setting of the relay 14 so that when the switch 2 closes and connects a faulty section to the circuit the overload circuit breakers 4 operate before the time relay 21 of the last switch to close can effect the resetting of its associated lockout relay 16 and so that when the switch 2 connects a normal section to the circuit the time relay 21 of the last closed switch, has sufficient time to reset its lockout before the time relay 14 associated with the next switch in the predetermined sequence can effect the reclosing of its associated switch.

The operation of the arrangement shown in the drawing is as follows: Under normal operating conditions all of the overload circuit breakers 4 and sectionalizing switches 2 are closed so that all of the sections 1 are connected in series. The voltage relay 12 and the low voltage trip coil 8 of each sectionalizing switch are energized so that the switches are held in their closed position by their respective latches 9. When a fault occurs on any section the overcurrent produced thereby causes the circuit breakers 4 to open so that the circuit is deenergized. After a predetermined time which is sufficient to allow the circuit breakers 4 to open and interrupt the supply of current to the circuit all of the sectionalizing switches 2 open so that the sections are disconnected from each other. The overload circuit breakers 4 are then reclosed either manually or automatically in any suitable manner, examples of which are well known in the art. As soon as one of the circuit breakers 4 is closed, for example the one shown on the left-hand side of the drawing in Fig. 1 the adjacent section is reenergized. The relay 12 associated with the switch 2 at the other end of the energized section immediately closes its contacts 24 and completes across the secondary of the transformer 13 an energizing circuit for the time relay 14. This energizing circuit also includes the auxiliary contacts 25 on the open switch 2 and the contacts 26 of the lockout relay 16. After a predetermined time, the relay 14 closes its contacts 28 and connects the operating coil 17 of the lockout relay 16, the closing coil 7 of the switch 2, the contacts 28 of the relay 14 and the contacts 24 of the relay 12 in series across the secondary of the transformer 13. The energization of the operating coil 17 of the lockout relay 16 moves the lockout relay to its lockout position in which position it is held by the latch 18. When the lockout relay 16 is in its lockout position, the contacts 26 in the energizing circuit of the control relay 14 are opened so that this relay cannot be reenergized to reclose the switch 2 until the lockout relay has been reset. The energization of the closing coil 7 closes the switch 2 so that the next section is energized.

If the conditions are normal on the next section the time relay 14 of the switch 2 at the other end of the energized section is energized and effects the closing of its associated switch in the manner above described. Before the next switch 2 can close, however, the coil of the time relay 21 of the last switch to be reclosed is connected across the secondary of the transformer 15 through contacts 30 of the relay 12 and contacts 31 of the lockout relay 16 and by closing its contacts 29 completes across the secondary of the transformer 15 an energizing circuit for the release magnet 19 so that the lockout relay 16 of the last switch to close is restored to its normal position before the next switch is reclosed.

The switches 2, therefore, are successively reclosed beginning with the one nearest the end section which is energized until either all of the switches are reclosed or one of them connects a faulty section to the circuit.

When any switch recloses and connects a faulty section to the circuit, the overload circuit breaker 4 at the end of the circuit again opens and deenergizes the circuit so that the opening of all of the closed switches is effected. It will be observed, however, that the lockout relay 16 associated with the last switch 2 that was reclosed is still in its lockout position because the overload circuit breaker 4 opened and deenergized the circuit before the time relay 21 associated with this switch 2 had time to affect the energization of its associated release magnet 19. Therefore, when the circuit breaker 4 is reclosed a second time, all of the switches 2 between the circuit breaker 4 and the fault section except the one at the end of the faulty section, which is locked out, are reclosed and remain closed.

When the circuit breaker 4 at the right end of the circuit shown in Fig. 1 is reclosed after a fault has effected the opening thereof, the operation of the sectionalizing switches 2 is the same as above described except that during the closing operation of a switch the relay 12 associated therewith is deenergized so that the relay 14, the operating coil 17 of the lockout relay 16 and the closing coil 7 of the switch are energized from the secondary of the transformer 15 instead of the secondary of the transformer 13.

It will be observed, therefore, that I have provided an arrangement for disconnecting and locking out the switches at each end of a section when a fault occurs on the section. Since each switch 2 is arranged to be opened and locked out when the voltages across the two adjacent sections fail to remain above predetermined values for a predetermined time after the switch is reclosed, and, 5 arranged not to be locked out when the voltages across the two adjacent sections remain above predetermined values for a predetermined time, it will be observed that a locked out sectionalizing switch may be reclosed automatically as soon as the fault on the faulty section has been removed and the section has been reenergized in any suitable manner for a predetermined length of time. Therefore a locked out switch 2 at one end of a section can be automatically reclosed by closing the switch 2 at the other end of the section after the fault has been removed.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, an electric circuit comprising a plurality of sections and sectionalizing switches connecting said sections in series, a source of current, an overload circuit breaker between said source and said circuit means for effecting the opening of all of the sectionalizing switches between the faulty section and the overload circuit breaker when a fault occurs on any section, and means associated with each sectionalizing switch and responsive to the voltages across the adjacent sections for effecting the closing of a switch when one of the adjacent sections is energized and for locking it out against a subsequent reclosure if the voltage across the other adjacent section fails to remain above a predetermined value for a predetermined time after the sectionalizing switch is closed.

2. In combination, an electric circuit comprising a plurality of sections and sectionalizing switches connecting said sections in series, a source of current, an overload circuit breaker between said source and said circuit, means for effecting the opening of all of the sectionalizing switches between the faulty section and the overload circuit breaker when a fault occurs on any section, and means associated with each sectionalizing switch and responsive to the voltages across the adjacent sections for effecting the closing of a switch when one of the adjacent sections is energized for a predetermined time and for locking it out against a subsequent reclosure if the voltage across the other adjacent section after said switch closes does not remain above a predetermined value for a predetermined time which is shorter than said first mentioned predetermined time.

3. In combination, an electric circuit comprising a plurality of sections and sectionalizing switches connecting said sections in series, a source of current, an overload circuit breaker between said source and said circuit, means for effecting the opening of all of the sectionalizing switches between the faulty section and the overload circuit breaker when a fault occurs on any section, and means associated with each sectionalizing switch for controlling the operation thereof comprising means responsive to the voltages across the respective adjacent sections, means controlled by said voltage responsive means for closing the switch when the voltage across one of the adjacent circuits remains above a predetermined value for a predetermined time, and lockout means controlled by said voltage responsive means for preventing said voltage responsive means from effecting a subsequent closing of the switch after its closing has been effected until both adjacent sections are simultaneously energized and the last section to be energized has remained energized for a predetermined time.

4. In combination, an electric circuit comprising a plurality of sections and sectionalizing switches connecting said sections in series, a source of current, an overload circuit breaker between said source and said circuit, means for effecting the opening of all of the sectionalizing switches between the fault section and the overload circuit breaker when a fault occurs on any section, and means associated with each sectionalizing switch for controlling the operation thereof comprising means responsive to the voltages across the respective adjacent sections, means controlled by said voltage responsive means for closing the switch when the voltage across one of the adjacent circuits remains above a predetermined value for a predetermined time, a lockout relay for controlling said circuit having an operating winding and a release winding, means for controlling the energization of said operating winding so that when said switch is closed said lockout relay is moved to its locked position to prevent further closing of said switch, and means controlled by said voltage responsive means for controlling said release winding so that said lockout relay is restored to its normal position to permit further closing of said switch when both of said adjacent sections are simultaneously energized for a predetermined time interval.

5. In combination, two electric circuits, a switch connecting said circuits, means for opening said switch, means responsive to the voltage across one of said circuits for closing said switch when said one of said circuits remains energized for a predetermined time, and means responsive to the voltage across the other circuit for rendering said first mentioned voltage responsive means inoperative to effect further closing of said switch if the voltage across said other circuit does not remain above a predetermined value for a predetermined time after said switch is closed.

6. In combination, two electric circuits, a switch connecting said circuits, means responsive to the voltage across the interconnected circuits for opening said switch when the voltage decreases below a predetermined value, means responsive to the voltage across one of said circuits for effecting the closing of said switch when the voltage across said one of said circuits remains above a predetermined value for a predetermined time, a lockout device arranged when in its lockout position to render said voltage responsive means inoperative to effect the closing of said switch, means for causing said lockout device to move to its lockout position when said switch is closed, and means responsive to the voltage across said circuits for causing said lockout device to be restored to its normal position when the voltages across both of said circuits simultaneously have remained above predetermined values for a predetermined time.

7. In combination, two electric circuits, a switch for connecting said circuits, a closing coil for said switch, a lockout relay having an operating coil which when energized operates the relay so that said closing coil cannot be subsequently energized and a release coil which when energized restores said relay to its normal position so that said closing coil can be subsequently energized, means responsive to a predetermined voltage across one of said circuits for effecting the simultaneous energization of said closing coil and said operating coil, and means responsive to the voltage across the other of said circuits for effecting the energization of said release coil if the voltage across said other circuit remains above a predetermined value for a predetermined time.

8. In combination, two electric circuits, a switch connecting said circuits, means responsive to the voltages across said circuits for effecting the opening of said switch when both circuits are simultaneously deenergized and means for closing said switch when either of said circuits is reenergized for a predetermined length of time and for preventing a subsequent reclosure of the switch if the voltages across both circuits fail to remain above predetermined values for a predetermined time after a reclosure of said switch.

9. In combination, two electric circuits, a switch connecting said circuits, means responsive to the voltages across said circuits for effecting the opening of said switch when both circuits are simultaneously deenergized and means for closing said switch when either of said circuits is reenergized for a predetermined length of time and for permitting a subsequent reclosure of said switch only after the voltages across both circuits have simultaneously remained above predetermined values for a predetermined time.

In witness whereof, I have hereunto set my hand this 30th day of January, 1929.

AMOS C. CONNELL.